US009369500B2

(12) United States Patent
Sandblad et al.

(10) Patent No.: US 9,369,500 B2
(45) Date of Patent: Jun. 14, 2016

(54) CALL HANDLING USING IP MULTIMEDIA SUBSYSTEM

(71) Applicant: Sony Corporation, Tokyo (JP)

(72) Inventors: Andreas Sandblad, Lund (SE); Pal Szasz, Lund (SE); Lars Novak, Bjarred (SE)

(73) Assignees: SONY CORPORATION, Tokyo (JP); SONY MOBILE COMMUNICATION INC., Tokyo (JP)

(*) Notice: Subject to any disclaimer, the term of this patent is extended or adjusted under 35 U.S.C. 154(b) by 68 days.

(21) Appl. No.: 14/372,620

(22) PCT Filed: Oct. 31, 2013

(86) PCT No.: PCT/IB2013/002420
§ 371 (c)(1),
(2) Date: Jul. 16, 2014

(87) PCT Pub. No.: WO2015/063531
PCT Pub. Date: May 7, 2015

(65) Prior Publication Data
US 2015/0117444 A1    Apr. 30, 2015

(51) Int. Cl.
*H04L 29/06*     (2006.01)
*H04M 3/436*    (2006.01)
*H04M 7/12*      (2006.01)

(52) U.S. Cl.
CPC ........ *H04L 65/1059* (2013.01); *H04L 65/1006* (2013.01); *H04L 65/1016* (2013.01); *H04L 65/1069* (2013.01); *H04L 65/1076* (2013.01); *H04L 65/1096* (2013.01); *H04M 3/4365* (2013.01); *H04M 7/1275* (2013.01);

(Continued)

(58) Field of Classification Search
CPC ............ H04L 65/1006; H04L 65/1016; H04L 65/1076; H04M 2201/42; H04M 3/42051; H04M 3/4365
See application file for complete search history.

(56) References Cited

U.S. PATENT DOCUMENTS 8,639,253 B2 * 1/2014 Narayanan et al. ........... 455/437
2012/0203940 A1 * 8/2012 Nishihara et al. .............. 710/48
(Continued)

FOREIGN PATENT DOCUMENTS

EP          1528775 A1     5/2005

OTHER PUBLICATIONS

H. Schulzrinne, "Communications Resource Priority for the Session Initiation Protocol (SIP)," Columbia U., Feb. 1, 2006.
(Continued)

*Primary Examiner* — Ayaz Sheikh
*Assistant Examiner* — Debebe Asefa
(74) *Attorney, Agent, or Firm* — Tucker Ellis LLP

(57) ABSTRACT

A network device receives, via a user interface, a selection to call a contact's mobile device. The mobile device detects a feature, on the contact's mobile device, that supports presenting a priority call notification and initiates, via a first communication protocol, a pending call to the contact's mobile device. The mobile device presents, prior to the pending call being connected and based on the detecting the feature set, a user interface to solicit a priority indicator option. The mobile device receives, via the user interface, a selection of the priority indicator option and sends, via a second communication protocol, a priority indication flag for the pending call.

20 Claims, 15 Drawing Sheets

(52) U.S. Cl.
CPC ..... *H04M2201/42* (2013.01); *H04M 2203/554* (2013.01); *H04M 2203/6009* (2013.01)

(56) References Cited

U.S. PATENT DOCUMENTS

2014/0378105 A1* 12/2014 Suryavanshi .............. 455/414.1
2015/0245189 A1* 8/2015 Nalluri et al. .............. 455/414.1

OTHER PUBLICATIONS

"3rd Generation Partnership Project; Technical Specification Group Services and System Aspects; Combining Circuit Switched (CS) and IP Multimedia Subsystem (IMS) services; Stage 2 (Release 11)," 3GPP TS 23.279, Release 11, Sep. 17, 2012.
International Search Report and Written Opinion dated Jun. 26, 2014, issued in corresponding PCT application No. PCT/IB2013/002420, 13 pages.

* cited by examiner

CALL HANDLING USING IP MULTIMEDIA SUBSYSTEM

BACKGROUND

The Internet Protocol (IP) multimedia subsystem (IMS), defined by the 3rd Generation Partnership Project (3GPP), is an architectural framework for implementing IP-based telephony and multimedia services. IMS defines a set of specifications that enables the convergence of voice, video, data and mobile technology over an all IP-based network infrastructure. The main protocol for IMS is Session Initiation Protocol (SIP). SIP is an application layer control (signaling) protocol for creating, modifying and terminating sessions with one or more participants. Other services, such as Rich Communication Services (RCS) based on GSMA standards, build on IMS to provide additional messaging and media services for mobile subscribers.

SUMMARY

According to one aspect, a method performed by a mobile device may include receiving, via a user interface, a selection to call a contact's mobile device; detecting a feature, on the contact's mobile device, that supports presenting a priority call notification; initiating, via a first communication protocol, a pending call to the contact's mobile device; presenting, prior to the pending call being connected and based on the detecting the feature, a user interface to solicit a priority indicator option; receiving, via the user interface, a selection of the priority indicator option; and sending, via a second communication protocol, a priority indication flag for the pending call.

Additionally, detecting the feature that supports presenting the priority call notification may include using Rich Communication Services (RCS) protocols to identify capabilities of the contact's mobile device.

Additionally, the detecting the feature that supports presenting the priority call notification may include providing a Session Initiation Protocol (SIP) OPTIONS signal to discover capabilities information of the contact's mobile device prior to receiving the selection of the contacts' mobile device to call.

Additionally, the first communication network may include a mobile voice network, and the second communication network may include a mobile data network.

Additionally, presenting the user interface to solicit the priority indicator option may include presenting an icon, on an outgoing call screen, that is selected to mark the priority of the pending call after the pending call is initiated.

Additionally, sending the priority indication flag for the pending call may include at least one of sending a SIP message that includes a tag to indicate the feature for presenting a priority call notification or sending a Message Session Relay Protocol (MSRP) message with data indicating the priority call notification.

Additionally, the SIP message may include data for the priority indication in JavaScript Object Notation (JSON) format or Extensible Markup Language (XML) format.

Additionally, the method may include storing, in a memory of the mobile device, a plug-in application for the user interface to support the priority call notification.

Additionally, the priority indication flag may be configured to cause the contact's mobile device to present a call priority indication on an incoming call screen, associated with the pending call, of the contact's mobile device.

According to another aspect, a mobile device may include a memory to store instructions and a processor. The memory may also store a plug-in application for a user interface to support priority call notification. The processor may execute the instructions in the memory to receive, via the user interface, a selection of a contact's mobile device to call; detect a feature, on the contact's mobile device, that supports presenting a priority call notification; initiate, via a first communication network, a pending call to the contact's mobile device; present, prior to the pending call being connected and based on the detecting the feature set, a user interface to solicit a priority indicator option; receive, via the user interface, a selection of the priority indicator option; and send, via a second communication network, a priority indication flag for the pending call.

Additionally, when detecting the feature that supports presenting the priority call notification, the processor may be further configured to detect the feature of the contact's mobile device prior to receiving the selection of the contacts' mobile device to call.

Additionally, when detecting the feature that supports presenting the priority call notification, the processor may be further configured to use RCS protocols to identify capabilities of the contact's mobile device.

Additionally, when presenting the user interface to solicit the priority indicator option, the processor may be further configured to present an icon on an outgoing call screen that is configured to be selected to mark the priority of the pending call after the pending call is initiated.

Additionally, the priority indication flag may be configured to cause the contact's mobile device to present a call priority indication on an incoming call screen, associated with the pending call, of the contact's mobile device, and the priority indication flag may be included within a SIP message that includes a tag to indicate the feature for presenting a priority call notification.

According to yet another aspect, a method performed by a mobile device may include storing, in a memory of the mobile device, a plug-in application for a user interface to support a priority call notification feature; providing, to a calling mobile device, an indication of the priority call notification feature; receiving, from the calling mobile device and via a first communication protocol, an indication of an incoming call; receiving, from the calling mobile device and via a second communication protocol, a priority indication flag for the incoming call; and presenting a user interface screen, for the incoming call, that includes a call notification of the incoming call that is based on the received indication and a priority notification for the incoming call that is based on the received priority indication flag.

Additionally, the method may further include providing an audible version of the a priority notification for the incoming call when the priority indication flag is received while another call is in progress on the mobile device.

Additionally, providing the indication of the priority call notification feature may include providing capabilities of the mobile device to the calling mobile device via RCS protocols.

Additionally, the method may further include detecting the received priority indication flag within a Session Initiation Protocol (SIP) message tag.

Additionally, the method may further include storing, in a call log for the mobile device, a record of the priority indication flag associated with the incoming call.

Additionally, the method may further include altering, based on the received priority indication flag, a ring tone type or ring tone volume for the incoming call.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements.

Systems and methods described herein extend existing mobile phone handling experiences via applications that may be added to (or "plugged into") the mobile phone user interface. The applications may be based on IMS and RCS standards and provide a richer feature set for ongoing phone calls. Features described herein may enable a caller to add a priority indication and/or general location information for outgoing calls. In other implementations, features may include exchanging location information or invoking interactive sessions during ongoing calls. As used herein, the term "plug-in" refers to an application plugged into or added to an existing mobile device user interface.

Figure 1:
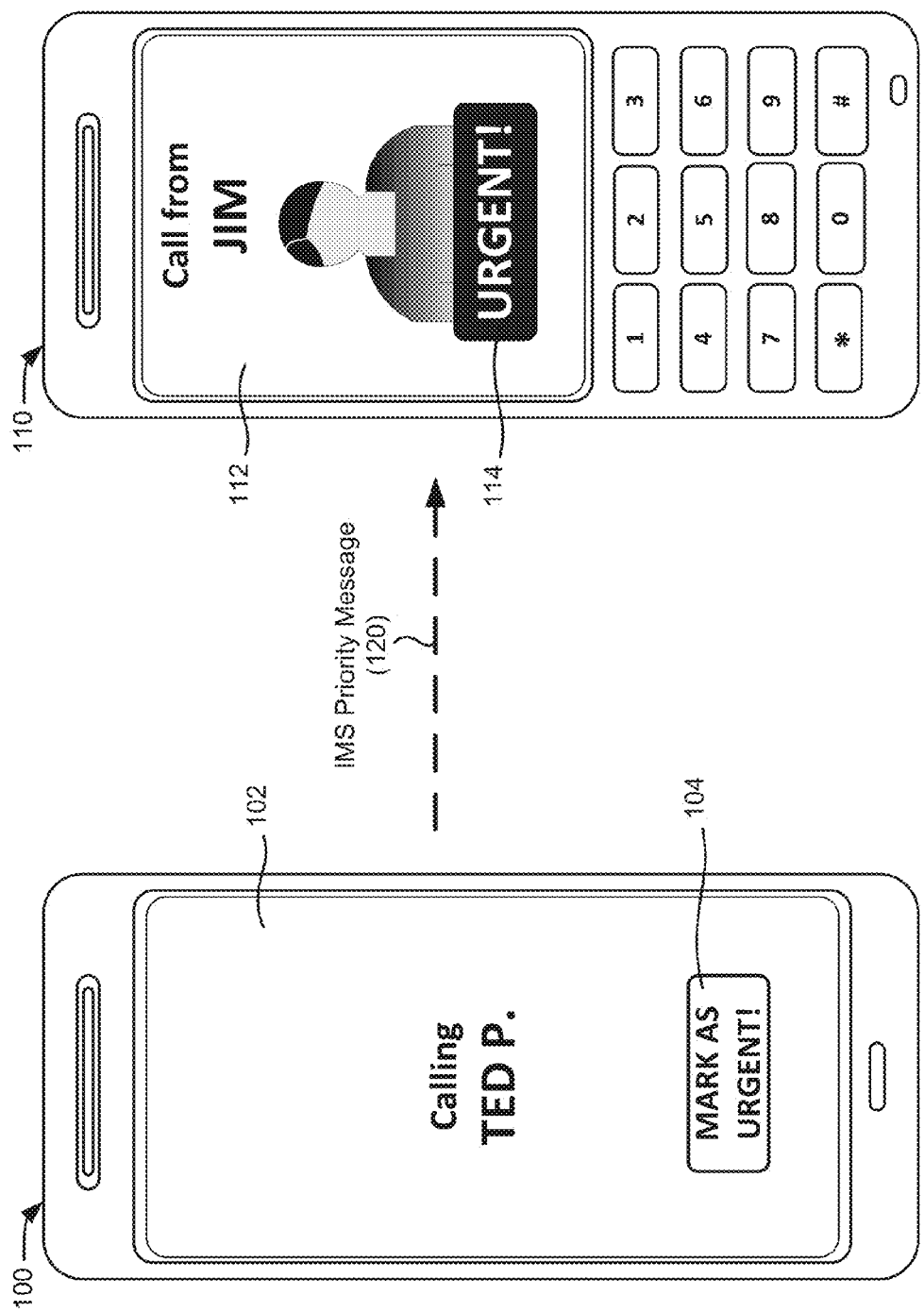
FIG. 1 illustrates a concept described herein.

FIG. 1 illustrates a concept described herein. In one implementation, the systems and methods described herein may provide an option for a caller to indicate a priority level for an outgoing voice call. As shown in FIG. 1, a calling device 100 may place a call to another device 110 (e.g., a receiving device 110). Calling device 100 may identify if receiving device 110 has the capability of indicating a call priority (e.g., a priority plug-in). When placing the call to receiving device 110, calling device 100 may present to the user a user interface 102 including a priority button 104 option. Upon selecting priority button 104, a priority plug-in on calling device 100 may transmit an IMS priority message 120 to receiving device 110. Upon receiving IMS priority message 120, receiving device 110 may provide a user interface 112 with an alert 114 of the incoming phone call priority (e.g., important, urgent, etc.). Alert 114 may be included, for example, in an incoming call screen, or in a notification area and call log for missed calls.

In one implementation, if the user of receiving device 110 is already talking on another call, alert 114 can be shown (and/or highlighted to the user via an audible tone) as a way of indicating that an important call is being blocked. In another implementation, IMS priority message 120 can also be used to override certain settings on the receiving mobile phone. For example, IMS priority message 120 may cause the priority plug-in on receiving device 110 to force ringing when receiving device 110 is in silent mode, increase the ring-tone volume, provide a different type of ring tone, or another user-selectable action. In another implementation, the priority plug-in may support multiple levels of priority (e.g., low priority, urgent, etc.). The priority of the call may be indicated to the recipient on receiving device 110 along with the call notification.

Although FIG. 1 shows exemplary user interfaces 102 and 112, in other implementations, user interfaces 102/112 may contain less, different, differently-arranged, or additional information than depicted in FIG. 1. For example, other features of user interface 112, such as sounds (e.g., notification sounds) or avatars, may also be presented in response to IMS priority message 120.

Figure 2:
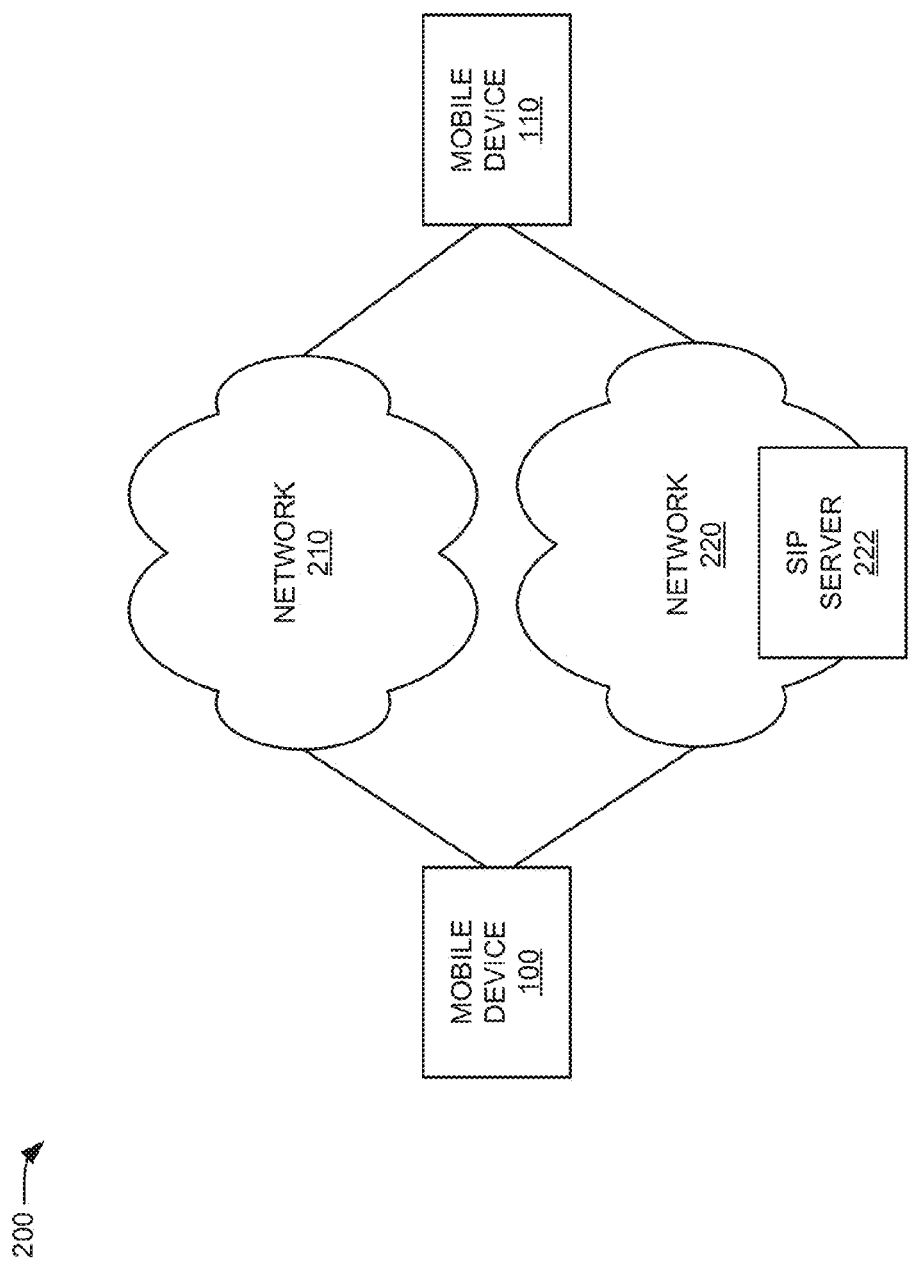
FIG. 2 shows an exemplary environment in which concepts described herein may be implemented.

FIG. 2 shows an exemplary environment 200 in which concepts described herein may be implemented. Environment 200 may include device 100, device 110, network 210, and network 220.

Mobile devices 100 and 110 may each include any type of device that is able to transmit and receive data, such as audio data, text data, video data, image data, multi-media data, etc. For example, device 100/110 may include a mobile phone, a smart phone, a tablet computer, a laptop computer, a personal digital assistant (PDA), or another type of portable communication device. As another example, device 100/110 may include a telephone device with video capability, and/or another type of computation or communication device (e.g., a vehicular communication system). In an exemplary implementation, device 100/110 may include a device that is capable of communicating over network 210 and/or network 220. In exemplary implementations described herein, device 100/110 may include one or more plug-ins that provides a user interface to configure, send, receive, and present priority notifications for calls.

Networks 210 and 220 may each include one or more wired, wireless and/or optical networks that are capable of receiving and transmitting data, voice, and/or video signals, including multi-media signals that include voice, data, and video information. For example, network 210 and network 220 may each include one or more public switched telephone networks (PSTNs) or other type of switched network. Network 210 and/or network 220 may also include one or more wireless networks and may include a number of transmission towers for receiving wireless signals and forwarding the wireless signals toward the intended destinations. Network 210 and/or network 220 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data.

In an exemplary implementation, network 210 may represent a mobile voice network and network 220 may represent a mobile data network. The voice network may include elements to facilitate voice traffic, such as a mobile switching center (MSC), a home location register (HLR), a signal transfer point (STP), and Signaling System 7 (SS7) links. The voice network may apply, for example, voice network standards (such as Global System for Mobile Communications (GSM) MAP, ANSI-41, etc.) to facilitate call handling of voice traffic. The data network may represent a network associated with a service provider that provides various services, such as Internet-protocol (IP) related services, value added services, etc. For example, in one implementation, network 220 may represent an IMS network that provides services to IMS subscribers. The IMS infrastructure of network 220 may allow two (or more) mobile devices (e.g., calling device 100 and receiving device 110) to communicate with each other, addressing each other with the respective phone numbers (e.g., mobile directory numbers or "MDNs"). Existing servers are used, and the security of the mobile devices' SIM cards can be used for authentication. Thus, using IMS to provide the enhanced call handling services described herein may require little to no investment in servers (compared to, for example, a cloud solution), may eliminate the need for extra accounts to provide authentication, and can be supported directly by service providers. RCS, which builds on IMS, may be used to further support features described herein.

Network 220 may include, for example, a SIP server 222 to perform signaling between mobile devices. SIP server 222 may include one or more computing devices that provide SIP signaling services to calling device 100 and receiving device 110. SIP signaling may be used to setup and tear down communication sessions, such as in setting up and tearing down voice or video calls or chat/text conversations. Additionally, or alternatively, as an IMS network, network 220 may include other devices, such as a home subscriber server (HSS) and a policy and charging rules function (PCRF) (not illustrated).

The exemplary configuration illustrated in FIG. 2 is provided for simplicity. It should be understood that a typical environment may include more or fewer devices than illustrated in FIG. 2. For example, two user devices 100 and 110 and two networks 210 and 220 are shown for simplicity. It should be understood that environment 200 may include a large number (e.g., hundreds or thousands) of user devices and a number of other networks. Environment 200 may also include additional elements, such as switches, routers, gateways, backend systems, etc., that aid in routing calls and/or information in environment 200 and providing services to parties associated with user devices 100/110.

Figure 3:
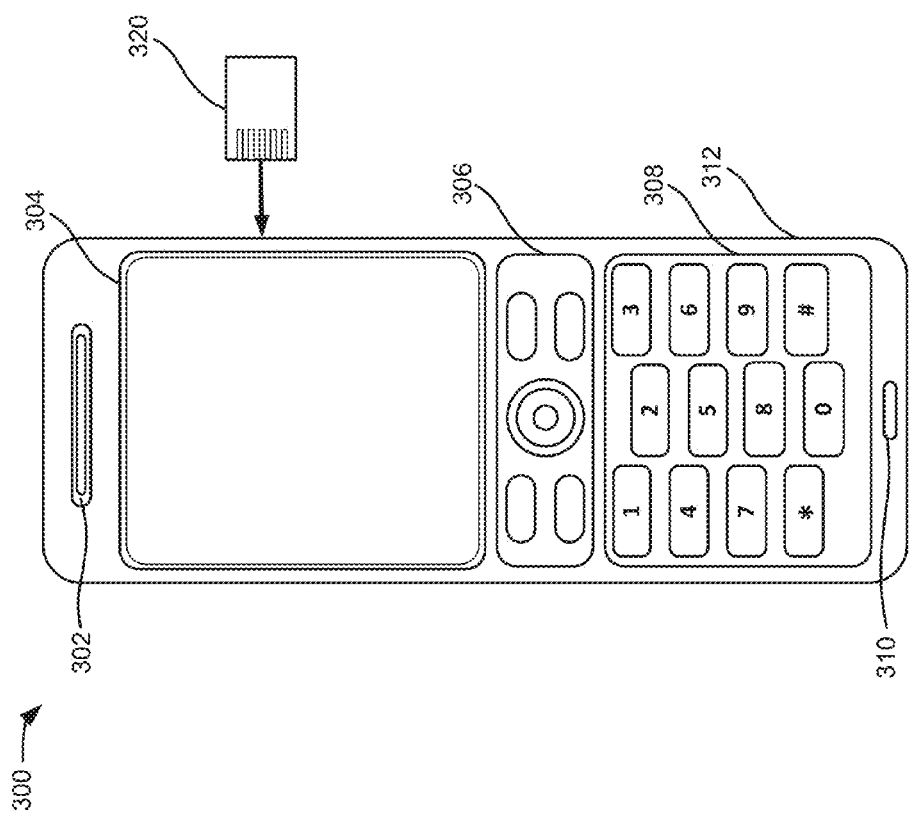
FIG. 3 is a diagram of an exemplary user device that may implement embodiments described herein.

FIG. 3 is a diagram of an exemplary device 300 that may implement embodiments described herein. Mobile devices 100 and 110 may include one or more devices 300. Although device 300 is depicted in FIG. 3 as a mobile phone, device 300 may include any of the following devices: a mobile telephone; a tablet, desktop, laptop, notebook, netbook, or personal computer; a PDA; a gaming device or console; a personal music playing device; a Global Positioning System (GPS) device; a digital camera; or another type of computational or communication device.

As shown in FIG. 3, device 300 may include a speaker 302, a display 304, control keys 306, a keypad 308, a microphone 310, a housing 312, and a removable memory card 320. Speaker 302 may provide audible information to a user of device 300. Display 304 may provide visual information to the user, such as the image of a caller, text, menus, video images, or pictures. Control keys 306 may permit the user to interact with device 300 to cause it to perform one or more operations, such as place or receive a telephone call. Keypad 308 may include a numeric, alphanumeric, and/or telephone keypad. Microphone 310 may receive sound, e.g., the user's voice during a telephone call.

Housing 316 may provide a casing for components of device 300 and may protect the components from outside elements. Removable memory card 320 may store applications and/or data files, such as pass codes, music, or video. When removable memory card 320 is inserted into user device 300, user device 300 may read the data files or execute the applications, for example.

Figure 4:
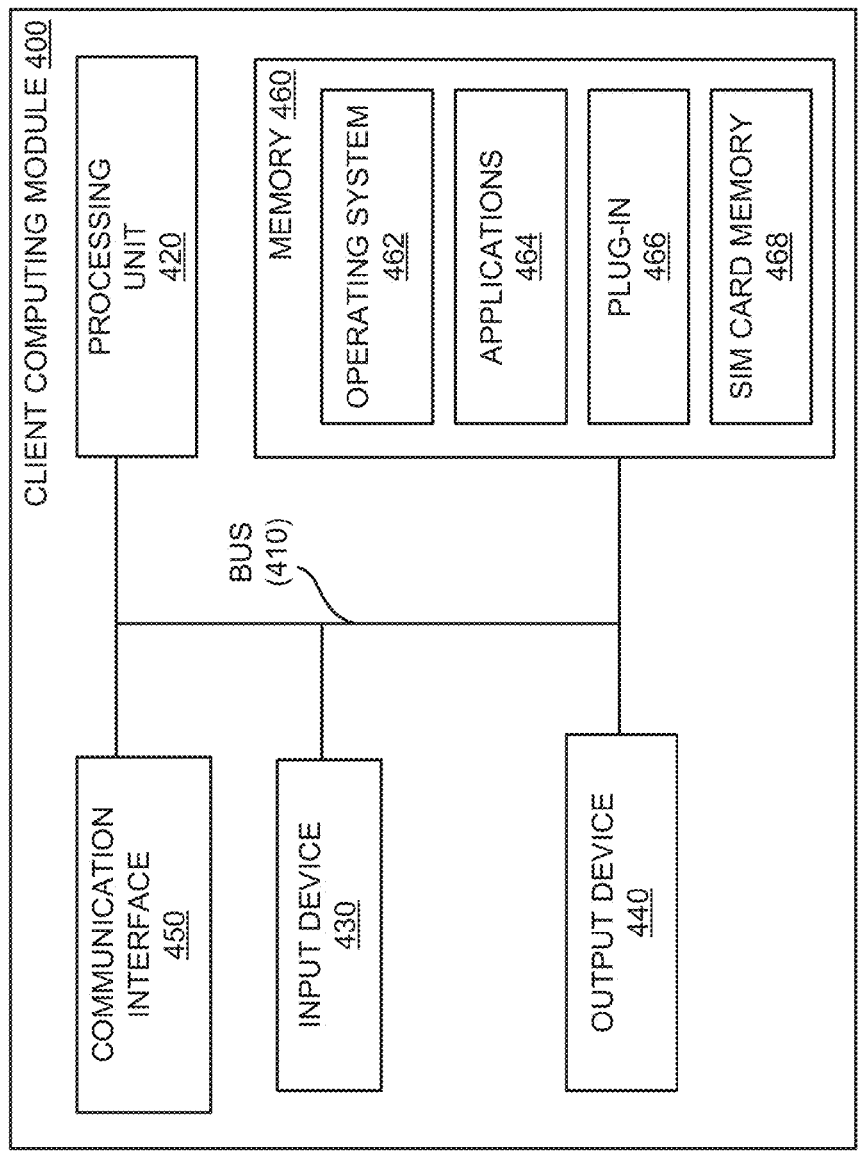
FIG. 4 is a block diagram of exemplary components of a client computing module.

FIG. 4 is a block diagram of exemplary components of a client computing module 400. User device 300 may each include one or more client computing modules 400. As shown, client computing module 400 may include a bus 410, processing unit 420, an input device 430, an output device 440, a communication interface 450, and a memory 460. Client computing module 400 may include other components (not shown) that aid in receiving, transmitting, and/or processing data. Moreover, other configurations of components in client computing module 400 are possible.

Bus 410 may include a path that permits communication among the components of client computing module 400. Processing unit 420 may include any type of processor or microprocessor (or groups of processors or microprocessors) that interprets and executes instructions. In other embodiments, processing unit 420 may include one or more application-specific integrated circuits (ASICs) or field-programmable gate arrays (FPGAs).

Input device 430 may include a device that permits a user to input information into client computing module 400, such as a keyboard (e.g., control keys 306 or keypad 308), a mouse, a pen, a microphone (e.g., microphone 310), a camera, a touch-screen display (e.g., display 304), etc. Output device 440 may output information to the user, such as a display (e.g., display 304), a speaker (e.g., speaker 302), etc. Input device 430 and output device 440 may allow the user to receive and view a menu of options and select from the menu options. The menu may allow the user to select the functions or services associated with applications executed by client computing module 400.

Communication interface 450 may include a transceiver that enables client computing module 400 to communicate with other devices or systems. Communications interface 450 may include a network interface card, e.g., Ethernet card, for wired communications or a wireless network interface (e.g., a WiFi) card for wireless communications. Communication interface 450 may implement a wireless communication protocol, e.g., long-term evolution (LTE), GSM, Code Division Multiple Access (CDMA), wideband CDMA (WCDMA), General Packet Radio Service (GPRS), Enhanced Data for GSM Evolution (EDGE), etc. Communication interface 450 may also include, for example, a universal serial bus (USB) port for communications over a cable, a Bluetooth™ wireless interface for communicating with Bluetooth devices, a near-field communication (NFC) interface, etc.

Memory 460 may include a random access memory (RAM) or another type of dynamic storage device that may store information and instructions, e.g., an application, for execution by processing unit 420; a read-only memory (ROM) device or another type of static storage device that may store static information and instructions for use by processing unit 420; or some other type of magnetic or optical recording medium and its corresponding drive, e.g., a hard disk drive (HDD), a solid state drive (SSD) or memory, for storing information and/or instructions.

Memory 460 may also include an operating system 462, applications 464, and plug-ins 466. Operating system 462 may include software instructions for managing hardware and software resources of the device. In the case of device 300, operating system 462 may include Android, Symbian, iOS, Windows Mobile, etc. Operating system 462 may include a user interface to manage operations of device 300, such as sending and receiving voice calls. Applications 464 may provide services to the user of the device, such as, for example, a browser for browsing the Internet. As described further herein, memory 460 may also include plug-ins 466. Plug-ins 466 may be added to, or work integrally with, applications 464 to perform particular functions not otherwise available in applications 464, such as to indicate call priorities, identify addresses information, and/or share locations with other mobile devices.

Memory 460 may also include a SIM card memory 468 or another removable memory device. SIM card memory 468 may be inserted into client computing module 400 for identifying the computing module in a GSM or other network. Different types of identity devices other than a SIM card are possible. For example, any type of removable user identity module is possible, such as R-UIM (Removable User Identity Module), which is common in Interim Standard 95 (IS-95 or cdmaOne) or CDMA2000 standard phones that employ code division multiple access (CDMA) channels.

Device 300 may perform certain operations described herein in response to processing unit 420 executing software instructions of an application contained in a computer-readable medium, such as memory 460. A computer-readable medium may include a tangible, non-transitory memory device. A memory device may include space within a single physical memory device or spread across multiple physical memory devices. The software instructions may be read into memory 460 from another computer-readable medium or from another device via communication interface 450. The software instructions contained in memory 460 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Figure 5:
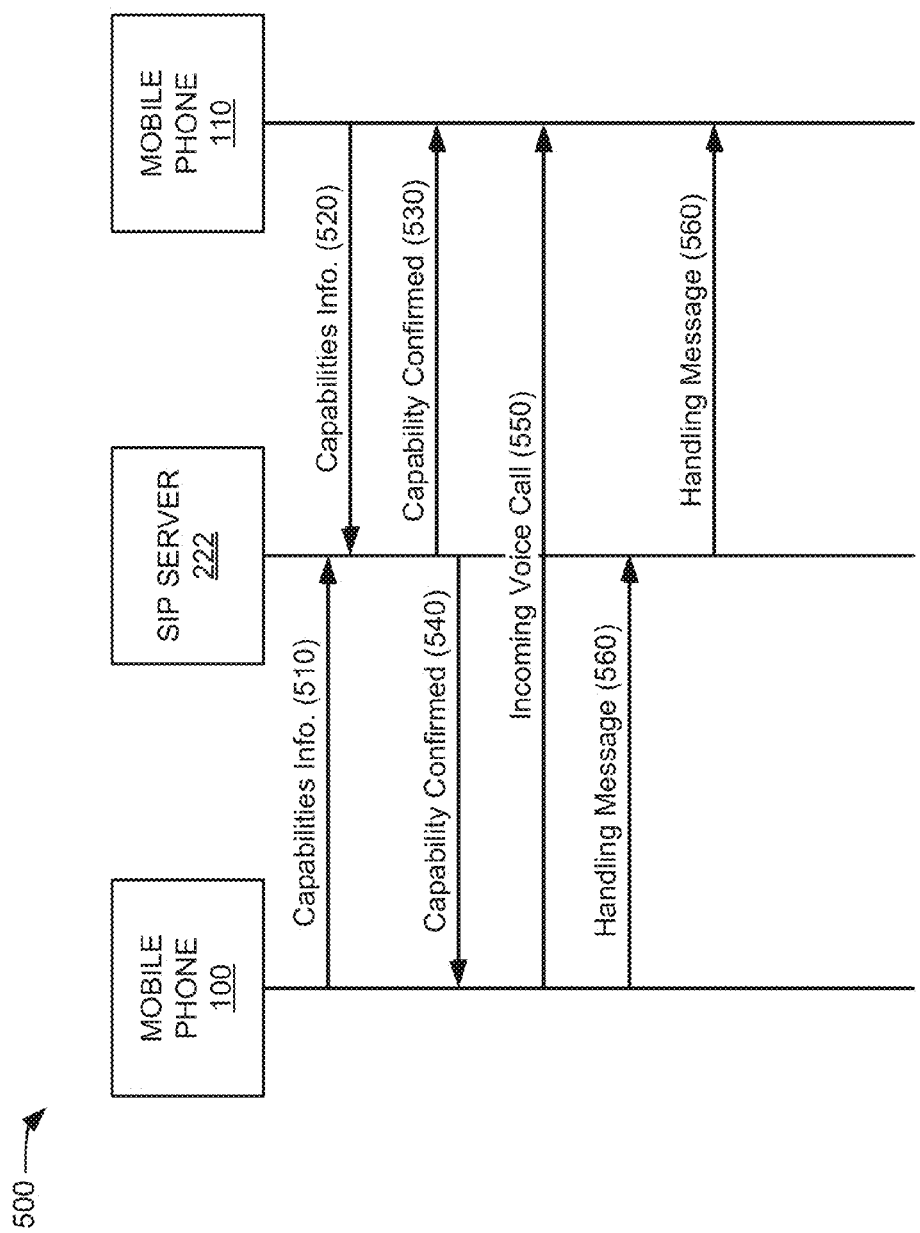
FIG. 5 is diagram of exemplary interactions among components of a portion of the network of FIG. 2.

FIG. 5 is diagram of exemplary communications among components of a portion 500 of environment 200. As shown in FIG. 5, portion 500 may include calling device 100, receiving device 110, and SIP server 222. Calling device 100, receiving device 110, and SIP server 222 may include features described above in connection with, for example, FIGS. 1-4.

Calling device 100 and receiving device 110 may use IMS/RCS protocols to identify capabilities of each device. The feature set (e.g., including available plug-ins) of each device may be exchanged with contacts of calling device 100/receiving device 110. For example, calling device 100 and receiving device 110 may use SIP OPTIONS signals to discover capabilities information of devices associated with contacts stored in a memory (e.g., memory 460) of calling device 100 and receiving device 110. Calling device 100 may submit capabilities information 510 to receiving device 110 via SIP server 222 using a SIP OPTIONS message. Similarly, receiving device 110 may submit capabilities information 520 to calling device 100 via SIP server 222 using another SIP OPTIONS message. Each of calling device 100 and receiving device 110 may confirm required capabilities 530/540 via, for example, a SIP 200 OK message. In another implementation, calling device 100 and receiving device 110 may exchange feature sets using other methods, such as a presence framework of IMS network 220.

After calling device 100 confirms that the feature set of receiving device 110 supports advanced call handling (e.g., call priority indications), calling device 100 may initiate an incoming voice call 550 to receiving device 110 (e.g., via network 210). Simultaneously, calling device 100 may provide a handling message 560. In one implementation, handling message 560 may be provided as a SIP message via SIP server 222 to provide a call priority indication. Handling message 560 may include, for example, a tag that may be interpreted by receiving device 110 to indicate a call priority or other information. In one implementation, handling message 560 may include IMS priority message 120 (FIG. 1). In another implementation, handling message 560 may be used to invoke other features on receiving device 110. Calling device may also send handling message 560 using other protocols within an SIP session. In some implementations, handling message 560 may be sent during an invoked SIP session using RCS protocols to exchange information during an ongoing call. The invoked sessions may be one-to-one and may not rely on an application server. The invoked sessions may allow mobile devices to exchange data during ongoing calls. In one implementation, the sessions may use Message Session Relay Protocol (MSRP) as the data transfer protocol, and the data in the MSRP messages may be included (e.g., packed) in XML or JSON format.

Although FIG. 5 shows exemplary communications among devices in environment portion 500, in other implementations, portion 500 may contain fewer, different, differently-arranged, or additional devices and communications than depicted in FIG. 5. Alternatively, or additionally, one or more devices of portion 500 may perform one or more other tasks described as being performed by one or more other components of portion 500.

Figure 6:
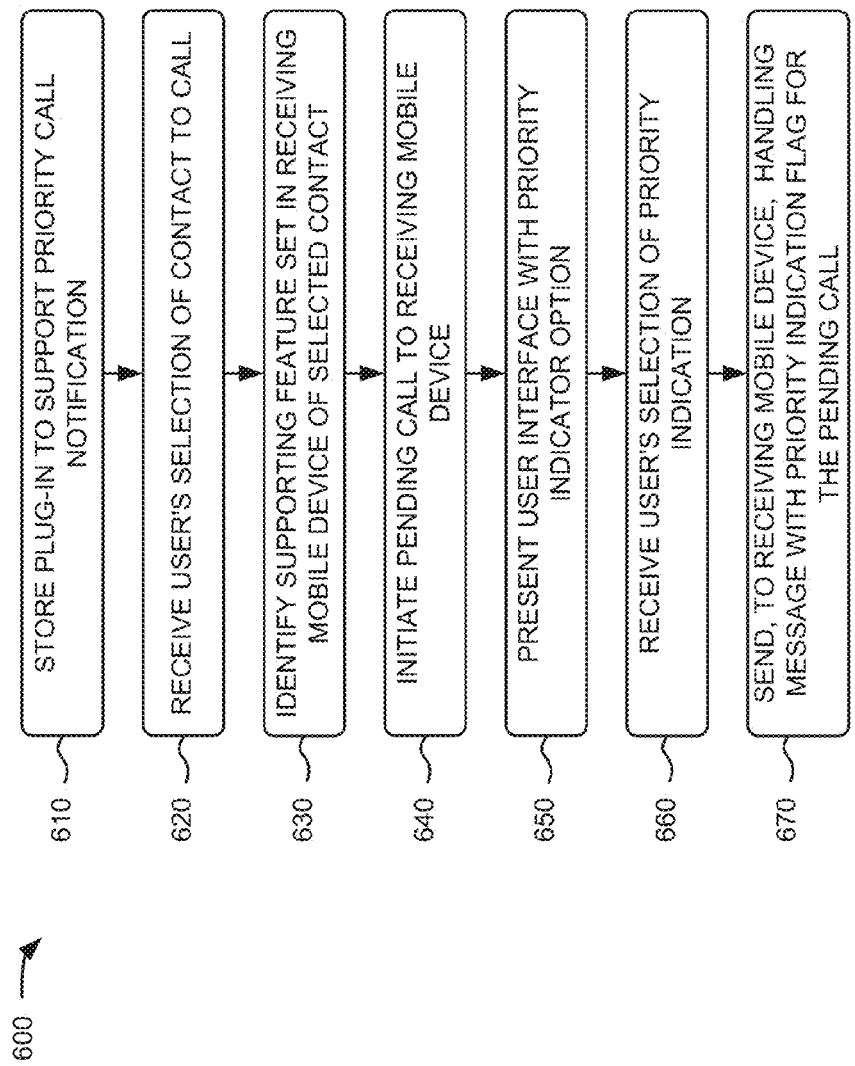
FIG. 6 is a flowchart of an exemplary process for providing a priority indication for an IMS-based call.
Figure 7:
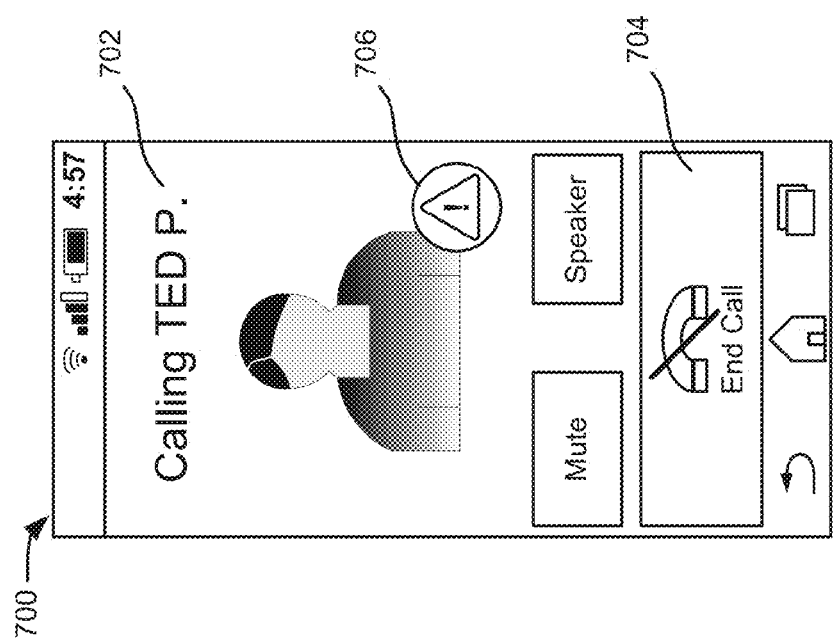
FIG. 7 is a diagram of an exemplary user interface that a may be presented during the process of FIG. 6 to assign a call priority.

FIG. 6 is a flowchart of an exemplary process 600 for providing a priority indication for an IMS-based call. Process 600 may be performed, for example, by calling device 100. In another implementation, process 600 may be performed by one or more other devices including or excluding calling device 100. Some aspects of process 600 are described below in the context of FIG. 7. FIG. 7 is an exemplary user interface 700 for an outgoing call, according to an implementation described herein.

Process 600 may include storing a plug-in to support priority call notification (block 610) and receiving a user's selection of a contact to call (block 620). For example, calling device 100 may receive (e.g., via a download or other installation process) a priority plug-in (e.g., plug-in 466) for a base user interface. The priority plug-in may enable calling device 100 to solicit and send a priority indication with an outgoing call. Calling device 100 may also receive a user's selection of a particular contact to call.

Process 600 may also include identifying a supporting feature set in a receiving mobile device of the selected contact (block 630). For example, calling device 100 may verify (e.g., from capabilities information 520 and/or confirmation 540) that receiving device 110 associated with the selected contact is able to receive a call priority indication.

Process 600 may additionally include initiating a pending call to the receiving mobile device (block 640) and presenting a user interface with a priority indicator option (block 650). For example, referring to FIG. 7, calling device 100 may present user interface 700 for an outgoing call. User interface 700 (e.g., an outgoing call screen) may be presented by calling device 100 when a user initiates a call to receiving device 110. As shown in FIG. 7, user interface 700 may include a contact identification area 702, a call control button 704, and a priority indicator icon 706. Contact identification area 702 may include a name, image, and/or other information about a party to be called from calling device 100. Call control button 704 may include one or more buttons to terminate a call, re-dial, or adjust call properties. Still referring to FIG. 7, priority indicator icon 706 may be presented on user interface 700 while the outgoing call is being processed. In one implementation, priority indicator icon 706 may be displayed only for contacts with a device (e.g., receiving device 110) that calling device 100 has already identified as supporting a priority identification feature.

Returning to FIG. 6, process 600 may further include receiving the user's selection of a priority indication (block 660), and sending, to the receiving mobile device, a handling message with a priority indication flag for the pending call (block 670). For example, referring again to FIG. 7, priority indicator icon 706 may be selected, for example, by a user of calling device 100 while waiting for a connection with receiving device 110. Priority indicator icon 706 may become highlighted (e.g., change color, flash, change shape/size, etc.) when selected. In another implementation, priority indicator icon 706 may be available for selection prior to initiation of the outgoing call. Selection of priority indicator icon 706 may cause calling device 100 to send a priority indication message (e.g., handling message 560) to receiving device 110. The priority indication message may identify calling device 100 so that the priority indication message can be associated with the corresponding call from calling device 100.

Figure 8:
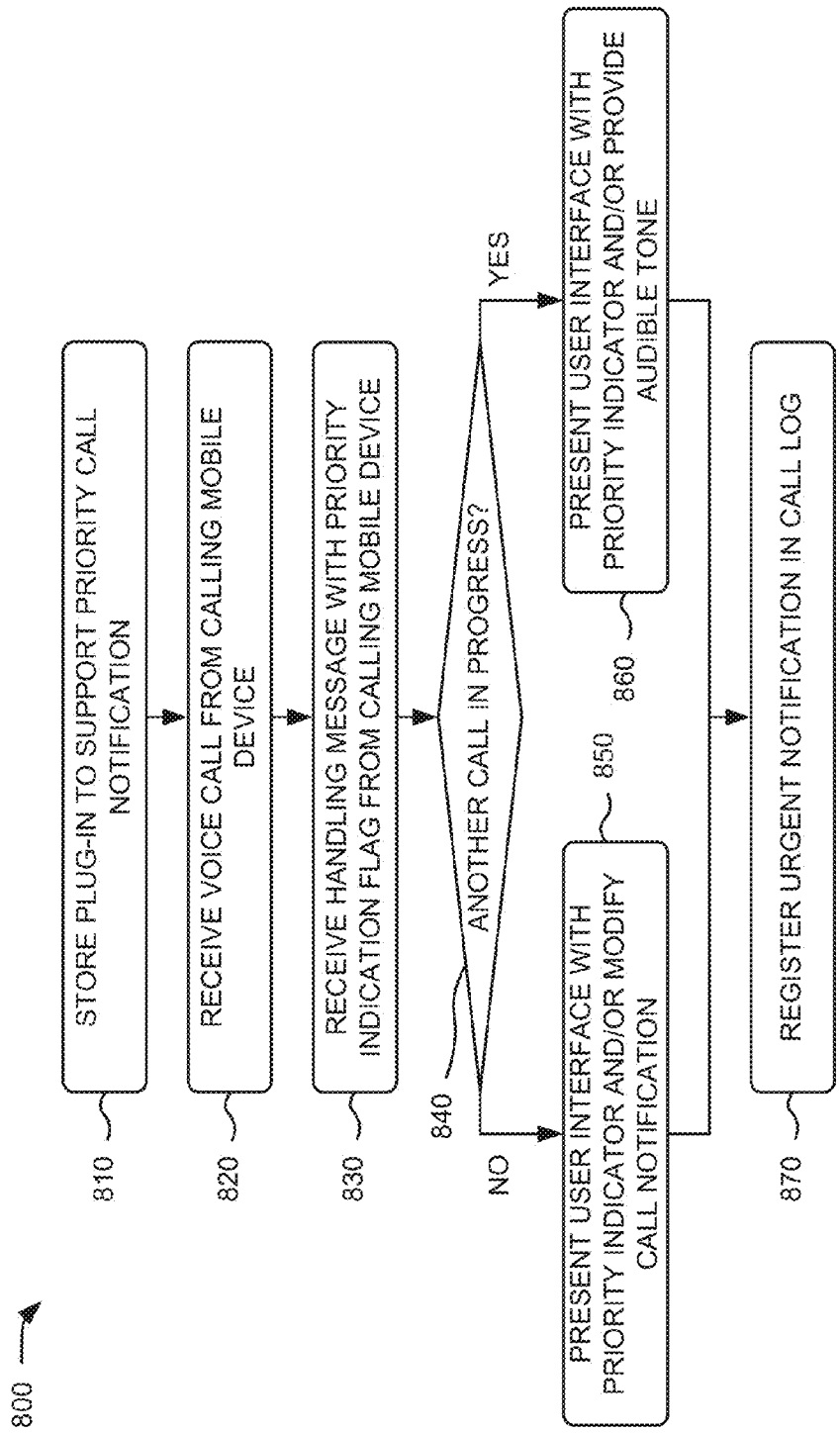
FIG. 8 is a flowchart of an exemplary process for receiving a priority indication for an IMS-based call.
Figure 9:
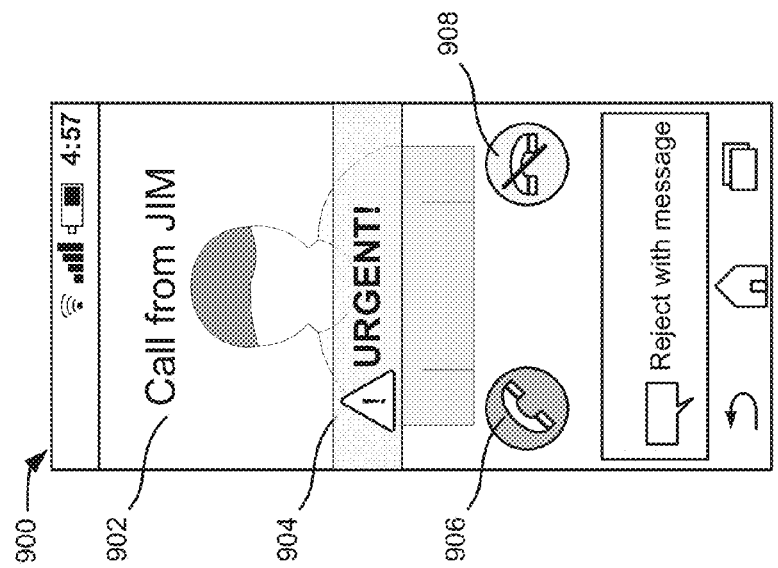
FIG. 9 is a diagram of an exemplary user interface that may be presented during the process of FIG. 8 to indicate a call priority.

FIG. 8 is a flowchart of an exemplary process 800 for receiving a priority indication for an IMS-based call. Process 800 may be performed, for example, by receiving device 110. In another implementation, process 800 may be performed by one or more other devices including or excluding receiving device 110. Some aspects of process 800 are described below in the context of FIG. 9. FIG. 9 is an exemplary user interface 900 for an outgoing call, according to an implementation described herein.

Process 800 may include storing a plug-in to support priority call notification (block 810). For example, receiving device 110 may receive (e.g., via a download or other installation process) a priority plug-in (e.g., plug-in 466) for a base user interface. The priority plug-in may enable receiving device 110 to receive and present a priority indication for an incoming call.

Process 800 may additionally include receiving a voice call from a calling mobile device (block 820) and receiving a handling message with a priority indication flag from the calling mobile device (block 830). For example, receiving device 110 may receive an incoming call via a voice network (e.g., network 210) and a priority indicator (e.g., handling message 560) for the call via an IMS network (e.g., network 220).

Process 800 may also include detecting if another call is in progress (block 840). If another call is not in progress (block 840—NO), then process 800 may include presenting a user interface with a priority indicator and/or modifying a call notification (block 850). For example, receiving device 110 may present user interface 900 for an incoming call. User interface 900 (e.g., an incoming call screen) may be presented by receiving device 110 when receiving device 110 detects a call from calling device 100. As shown in FIG. 9, user interface 900 may include a contact identification area 902, a call priority indication 904, and call control buttons 906/908. Contact identification area 902 may include a name, image, and/or other information about a calling parting (e.g., the person associated with calling device 100). Some or all of contact identification area 902 may be based on information from an incoming call received, e.g., via a mobile voice network (e.g., network 210). Call priority indication 904 may include a visual notification of an incoming call priority. In one example, call priority indication may take the form of alert 114 (FIG. 1). As shown in FIG. 9, call priority indication 904 may be prominently displayed on the incoming call screen. Call priority indication 904 may be presented on user interface 900 while the incoming call is pending (e.g. before the call is answered/rejected). Call control buttons 906/908 may include one or more buttons to allow a user to answer the call or reject the call.

Additionally, or alternatively, the priority plug-in may modify the standard call notifications for receiving device 110 when a priority indicator is received. For example, receiving device 110 may force ringing when receiving device 110 is in silent mode, increase the ring-tone volume, provide a different ring tone, or another user-selectable action. In one implementation, the priority plug-in may allow a user to configure notification types for all contact or for particular contacts.

Returning to FIG. 8, if another call is in progress (block 840—YES), then process 800 may include presenting a user interface with a priority indicator and/or providing an audible tone (block 860). For example, receiving device 110 may present user interface for an incoming call that may be similar to user interface 900. However, since the user may have receiving device 110 positioned to use for an existing call (e.g., against the side of the users' face), the incoming call screen may not be visible to the user. Thus, receiving device 110 may also provide an audible tone or blip (e.g., over the existing call) to indicate an urgent incoming call.

Process 800 may further include registering an urgent notification in a call log for the receiving mobile device (block 870). For example, receiving device 110 may add to a recent calls log (or another data structure) a symbol or another indication that a particular priority notification (e.g., "Urgent!") was connected with or corresponds to the incoming call.

Figure 10:
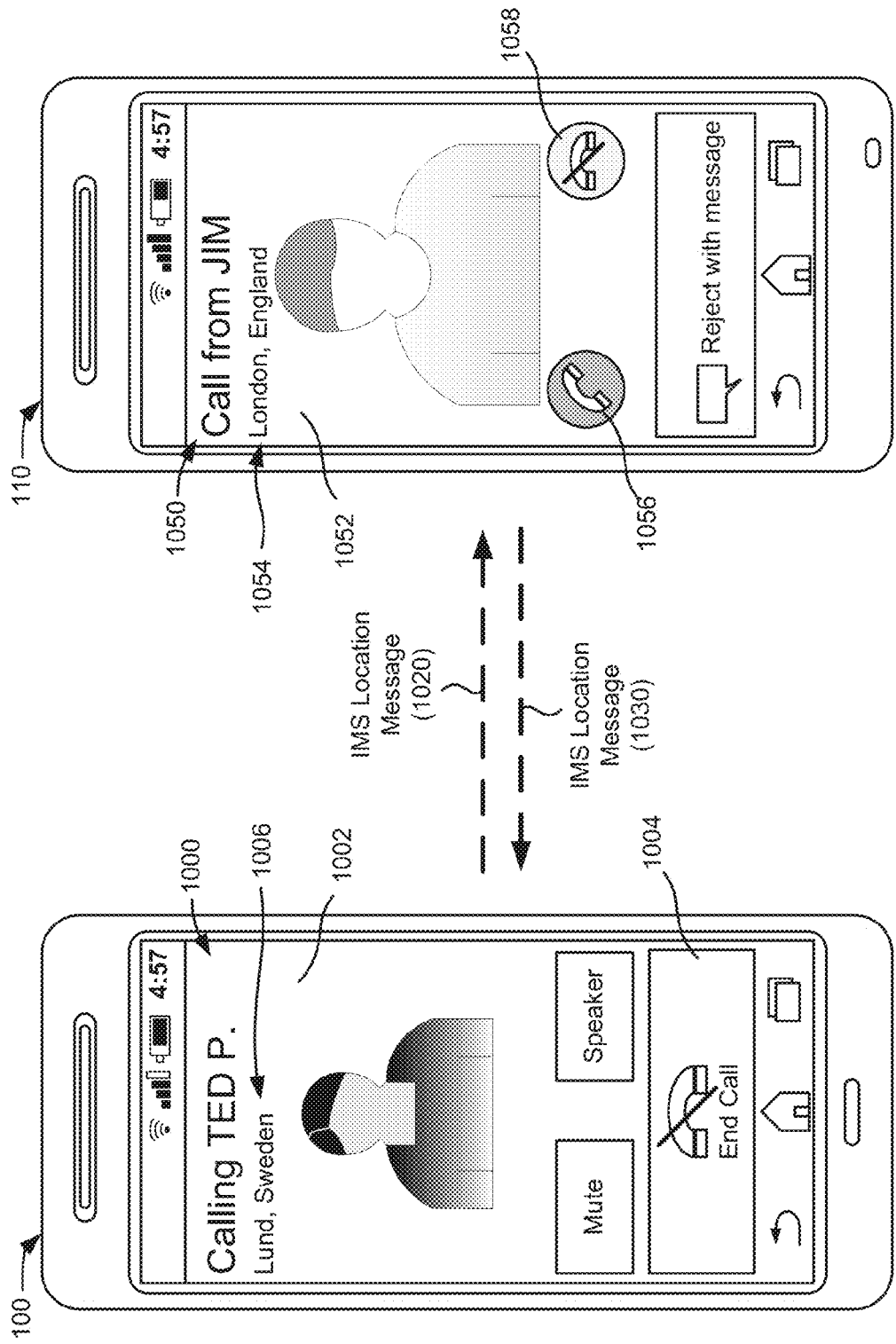
FIG. 10 is a diagram of an exemplary user interface that may be presented when initiating a call to indicate a caller's location.

FIG. 10 is a schematic of user interfaces for an outgoing call from calling device 100 to receiving device 110, according to another implementation described herein. User interfaces 1000 (for calling device 100) and 1050 (for receiving device 110) may present information exchanged via IMS location messages 1020/1030, such as city, state, and country information prior to connecting a call. For privacy reasons the exact location (e.g., street address, GPS coordinates, etc.) may not be shown.

As shown in FIG. 10, calling device 100 may present user interface 1000 for an outgoing call. User interface 1000 (e.g., an outgoing call screen) may be presented by calling device 100 when a user initiates a call to receiving device 110. Similarly, receiving device 110 may present user interface 1050 for an incoming call. User interface 1050 (e.g., an incoming call screen) may be presented by receiving device 110 when receiving device 110 detects an incoming call from calling device 100.

User interface 1000 may include a contact identification area 1002, a call control button 1004, and a location indication 1006. Contact identification area 1002 may include a name, image, and/or other information about a party to be called from calling device 100. Call control button 1004 may include one or more buttons to terminate a call, re-dial, or adjust call properties. Location indication 1006 may identify a general location of the called device (e.g., receiving device 110) and be presented on user interface 1000 while the outgoing call is being processed. In one implementation, location indication 1006 may be displayed only for contacts with a device (e.g., receiving device 110) that calling device 100 detects a location indicating feature. For example, if user of receiving device 110 has turned on an "auto share city" setting (e.g., associated with plug-in 466), the approximate position of receiving device 110 will be provided to calling device 100 and displayed as location indication 1006.

User interface 1050 may include a contact identification area 1052, a location indication 1054, and call control buttons

1056/1058. Contact identification area 1052 may include a name, image, and/or other information about a calling party (e.g., the person associated with calling device 100). Location indication 1054 may identify a general location of the calling device (e.g., calling device 100) and be presented on user interface 1050 during (and after) the incoming call notification. Call control buttons 1056/1058 may include one or more buttons to allow a user to answer the call or reject the call.

Location information for user interfaces 1000/1050 may be transferred as an IMS location messages 1020/1030 (if the other user also supports this feature) using an IMS/RCS capability support mechanism. Additionally, or alternatively, IMS location messages 1020/1030 can be extended to show, for example, weather information for the location of calling device 100 and/or receiving device 110 (or other location-based information). Other information may also be automatically shared (and shown on the incoming call screen), such as selected text, images, local time, and/or ring signals.

Although FIG. 10 provides exemplary user interfaces for indicating location for an outgoing and incoming call, in other implementations, different or additional information may be presented.

Figure 11:
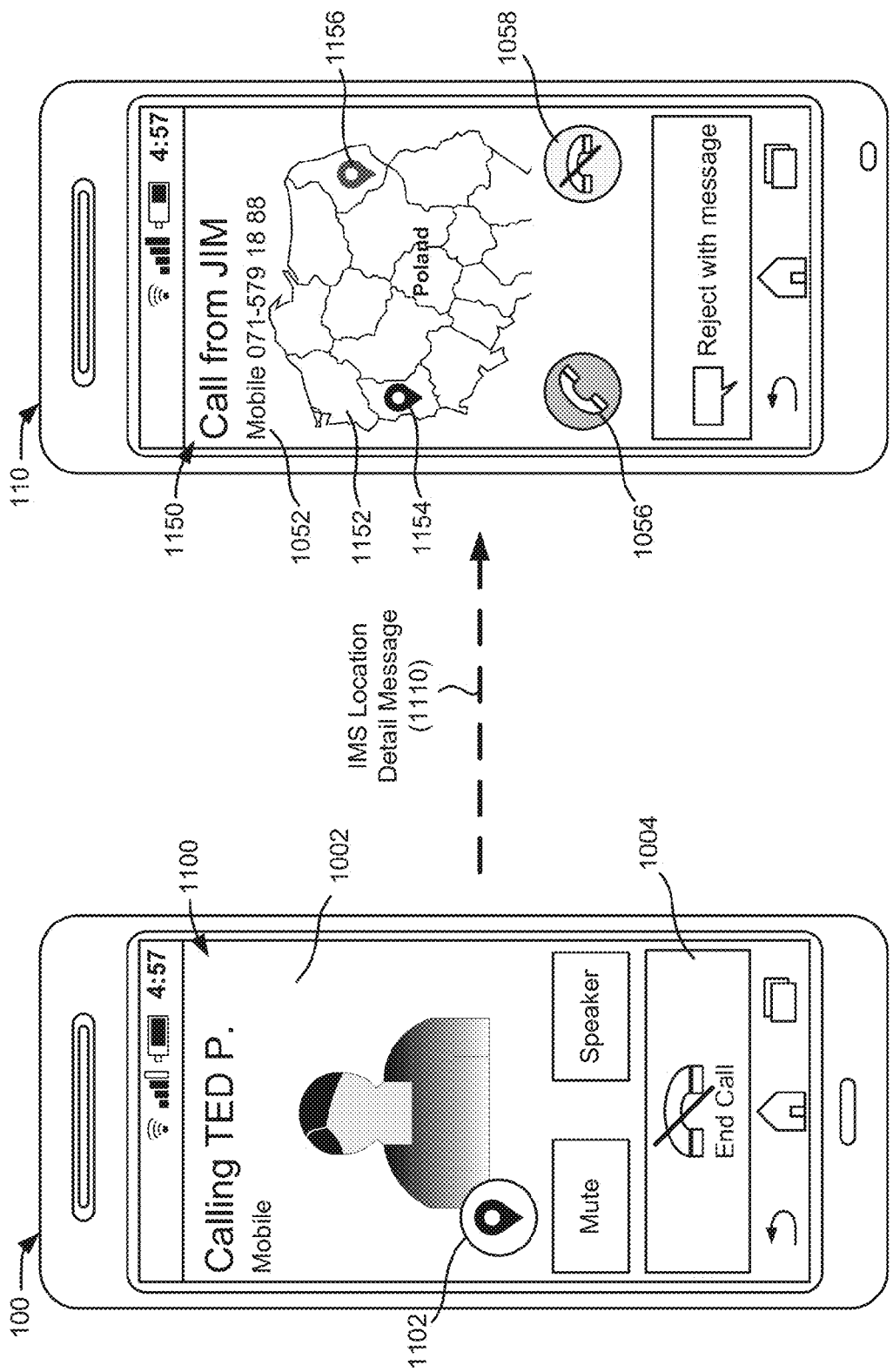
FIGS. 11 through 14 are diagrams of exemplary user interfaces that a may be presented during an ongoing call according to implementations described herein.

FIG. 11 is a schematic of user interfaces for an outgoing call from calling device 100 to receiving device 110, according to another implementation described herein. User interfaces 1100 (for calling device 100) and 1150 (for receiving device 110) may present information exchanged via IMS location detail message 1110. IMS location detail message 1110 may provide, mapping coordinates, GPS coordinates, or other location information of calling device 100.

User interface 1100 for calling device 100 may include features similar to those described above for user interface 700 and/or 1000. Additionally, user interface 1100 may include a pinpoint location icon 1102. Pinpoint location icon 1102 may be presented on user interface 1100 while the outgoing call is being processed or after the call is connected. In one implementation, pinpoint location icon 1102 may be displayed only for contacts with a device (e.g., receiving device 110) that calling device 100 has already identified as supporting a location presentation feature. Selection of pinpoint location icon 1102 may cause calling device 100 to send IMS location detail message 1110 to receiving device 110 (e.g., via handling message 560).

Upon receiving IMS location detail message 1110, receiving device 110 may present user interface 1150. User interface 1150 may include features similar to those described above for user interface 900 and/or 1050. However, some of the contact identification area (e.g., contact identification area 1052), such as the contact picture, may be replaced with a map 1152. Map 1152 may indicate a caller's location 1154 and a recipient's location 1156. Caller's location 1154 may represent the current position (e.g., GPS coordinates, etc.) of calling device 100 as indicated by IMS location detail message 1110. Recipient's location 1156 may represent the current position of receiving device 110 based on, for example, GPS information obtained locally by receiving device 110. In one implementation, a user of receiving device 110 may zoom in/out map 1152 to more precisely identify caller's location 1154.

In another implementation, pinpoint location icon 1102 may be available on a user interface for a connected call. Thus, one user of calling device 100 or receiving device 110 may share IMS location detail message 1110 during an ongoing call and a corresponding map 1152 may be presented to the other user.

Although FIG. 11 provides exemplary user interfaces for providing pinpoint locations for an outgoing and incoming call, in other implementations, different or additional information may be presented.

Figure 12A:
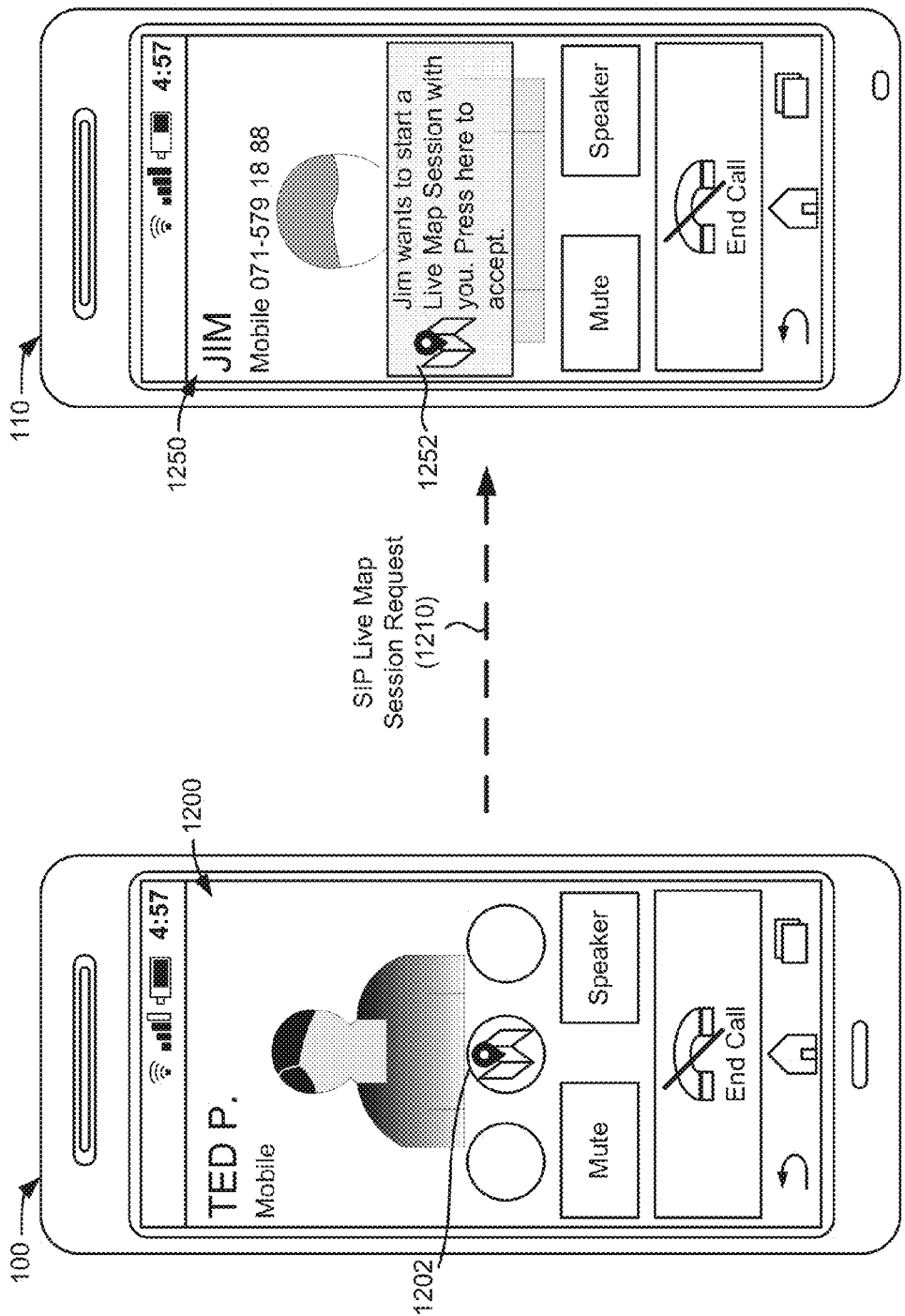
Figure 12B:
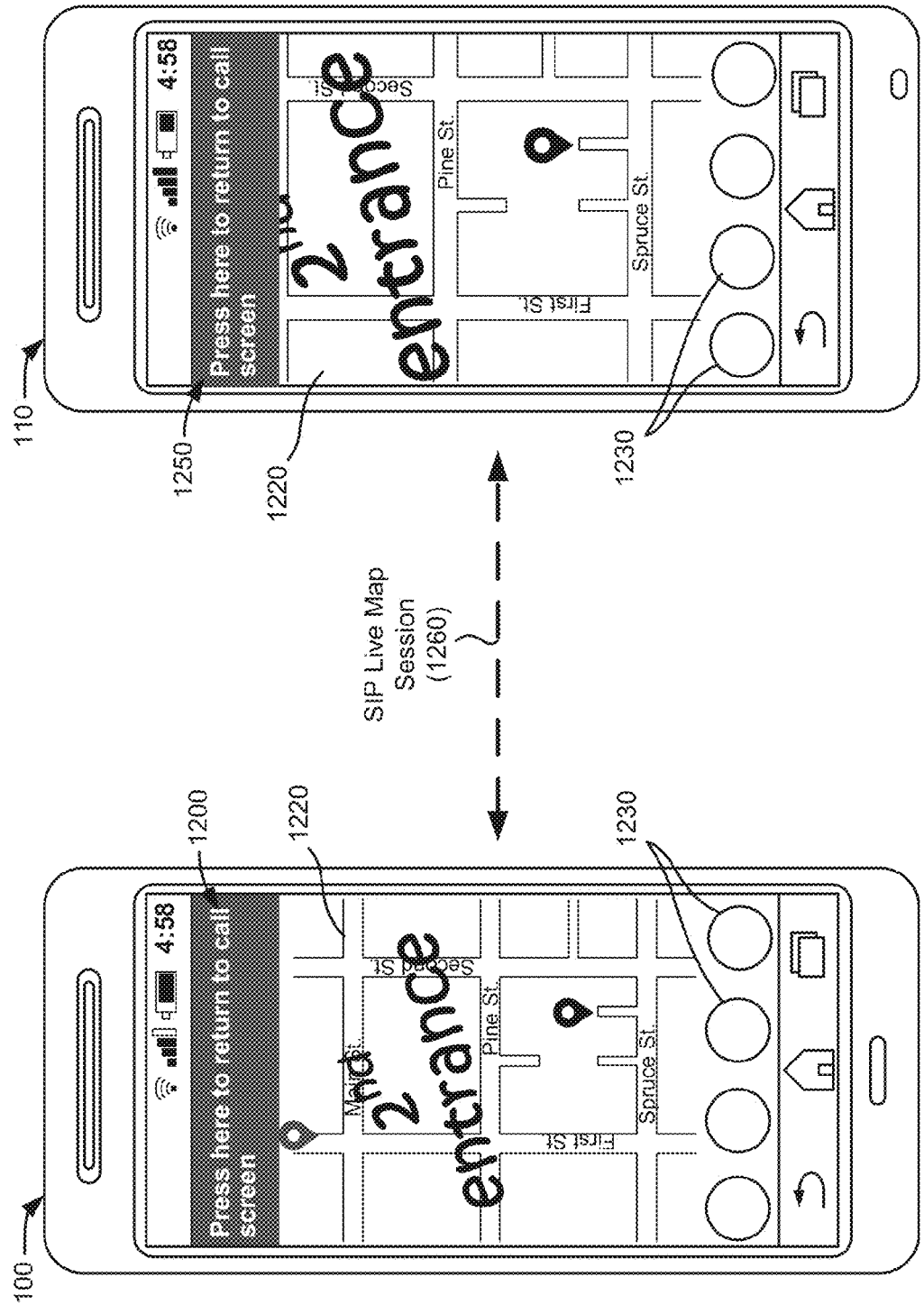

FIGS. 12A and 12B are schematics of user interfaces for an ongoing call between calling device 100 and receiving device 110, according to another implementation described herein. User interfaces 1200 (for calling device 100) and 1250 (for receiving device 110) may present steps to initiate and conduct a live map session between devices.

Referring to FIG. 12A, a user of calling device 100 may select a live maps icon 1202 from user interface 1200 to initiate a SIP live map session request 1210. In one implementation, live maps icon 1202 may be displayed only for contacts with a device (e.g., receiving device 110) that calling device 100 has already identified as supporting a live map session feature. Upon receiving SIP live map session request 1210, device 110 may present a request notification 1252 on user interface 1250. However, since the user may have receiving device 110 positioned to use for the existing call (e.g., against the side of the user's face), request notification 1252 may not be visible to the user. Thus, receiving device 110 may also provide an audible tone or blip (e.g., over the existing call) to indicate a response to request notification 1252 is needed.

Referring to FIG. 12B, upon a user's accepting SIP live map session request 1210, both calling device 100 and receiving device 110 may conduct a SIP live map session 1260 to view an interactive map 1220 where both users (and more for a group conference call) can see each other's position. On interactive map 1220 each user can provide mark-up, such as notes and sketches. Each user can control his/her zoom level and current navigation position using, for example, map controls 1230. Map controls 1230 may include, for example, zoom and pan commands, drawing tools, an undo/redo command, etc. If an incoming mark-up occurs so that the other user cannot see it, there may be a highlight and a possibility to navigate (e.g., pan) to the marked-up area. Communication for SIP live map session 1260 may be accomplished via a IMS/RCS communication channel, if the other user has the IMS/RCS capability for the live map session feature. All positions and sketches may be saved locally on both calling device 100 and receiving device 110 (e.g., in memory 460) and can be viewed after the call.

Although FIGS. 12A and 12B provide exemplary user interfaces for initiating and conducting a live map session, in other implementations, different or additional information may be presented.

Figure 13:
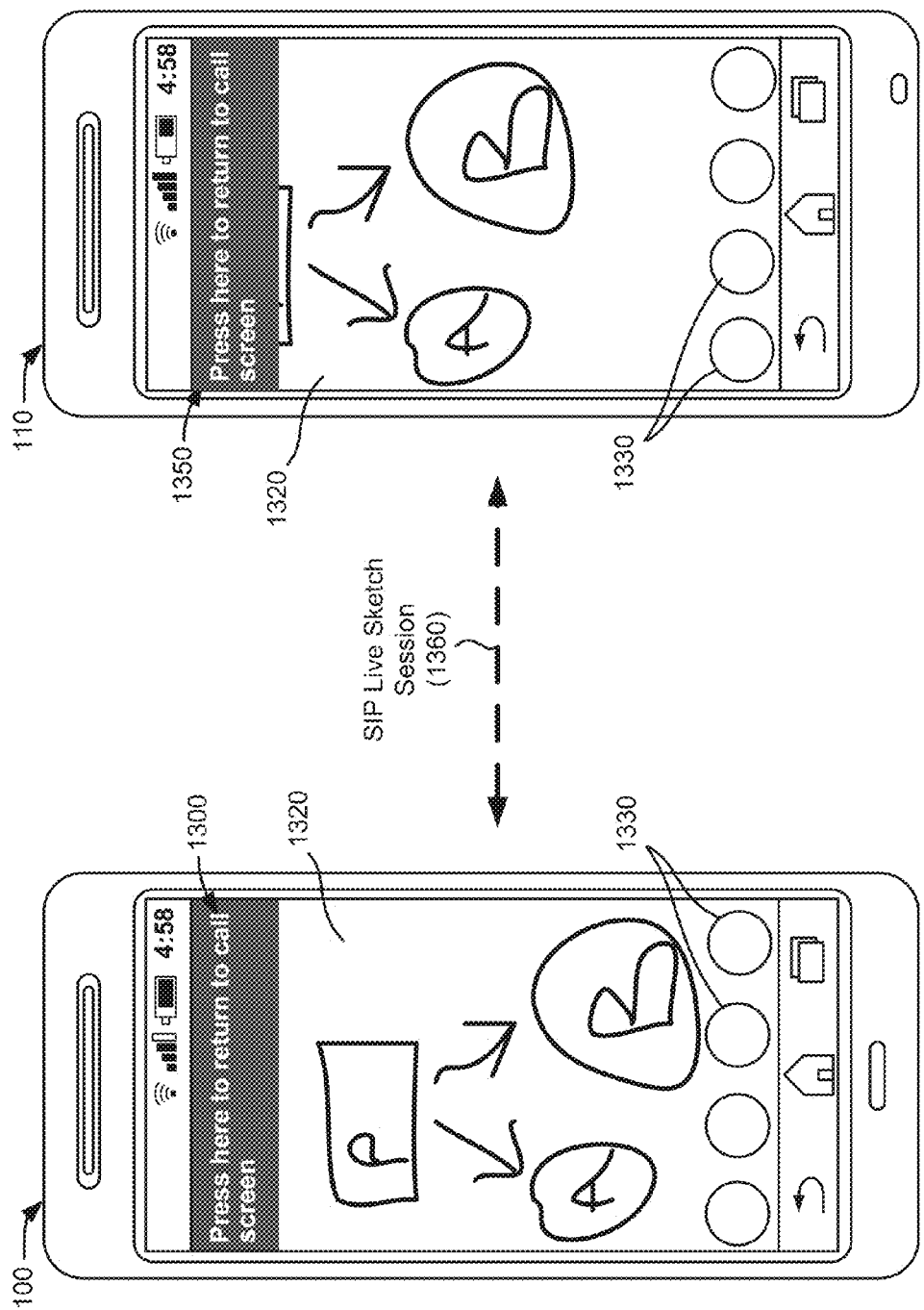

FIG. 13 is a schematic of user interfaces for an ongoing call between calling device 100 and receiving device 110, according to another implementation described herein. User interfaces 1300 (for calling device 100) and 1350 (for receiving device 110) may present steps to conduct a live sketch session 1360 between devices.

The sketch session represented in FIG. 13 may be initiated similarly to SIP live map session 1260 of FIG. 12A. That is, a user of calling device 100 may select an icon (e.g., a live sketch icon) from user interface 1300 to initiate a SIP live sketch session request. Upon receiving a SIP live sketch session request, device 110 may present a request notification on user interface 1350. However, since the user may have receiving device 110 positioned to use for the existing call (e.g., against the side of the user's face), the request notification may not be visible to the user. Thus, receiving device 110 may also provide an audible tone or blip to indicate a response to the request notification is needed.

Referring to FIG. 13, upon a user's accepting the SIP live sketch session request, both calling device 100 and receiving device 110 may view sketch area 1320 where both users can see each other's drawing activity. On sketch area 1320 each user can provide input. Each user can control his/her zoom level and current navigation position using, for example, sketch controls 1330. Similar to map controls 1230, sketch controls 1330 may include, for example, zoom and pan commands, drawing tools, an undo/redo command, color options, etc. Communication for live sketch session 1360 may be accomplished via a IMS/RCS communication channel, if the other user has the IMS/RCS capability for the live map session feature. All sketches may be saved locally on both calling device 100 and receiving device 110 (e.g., in memory 460) and can be viewed after the call.

Figure 14:
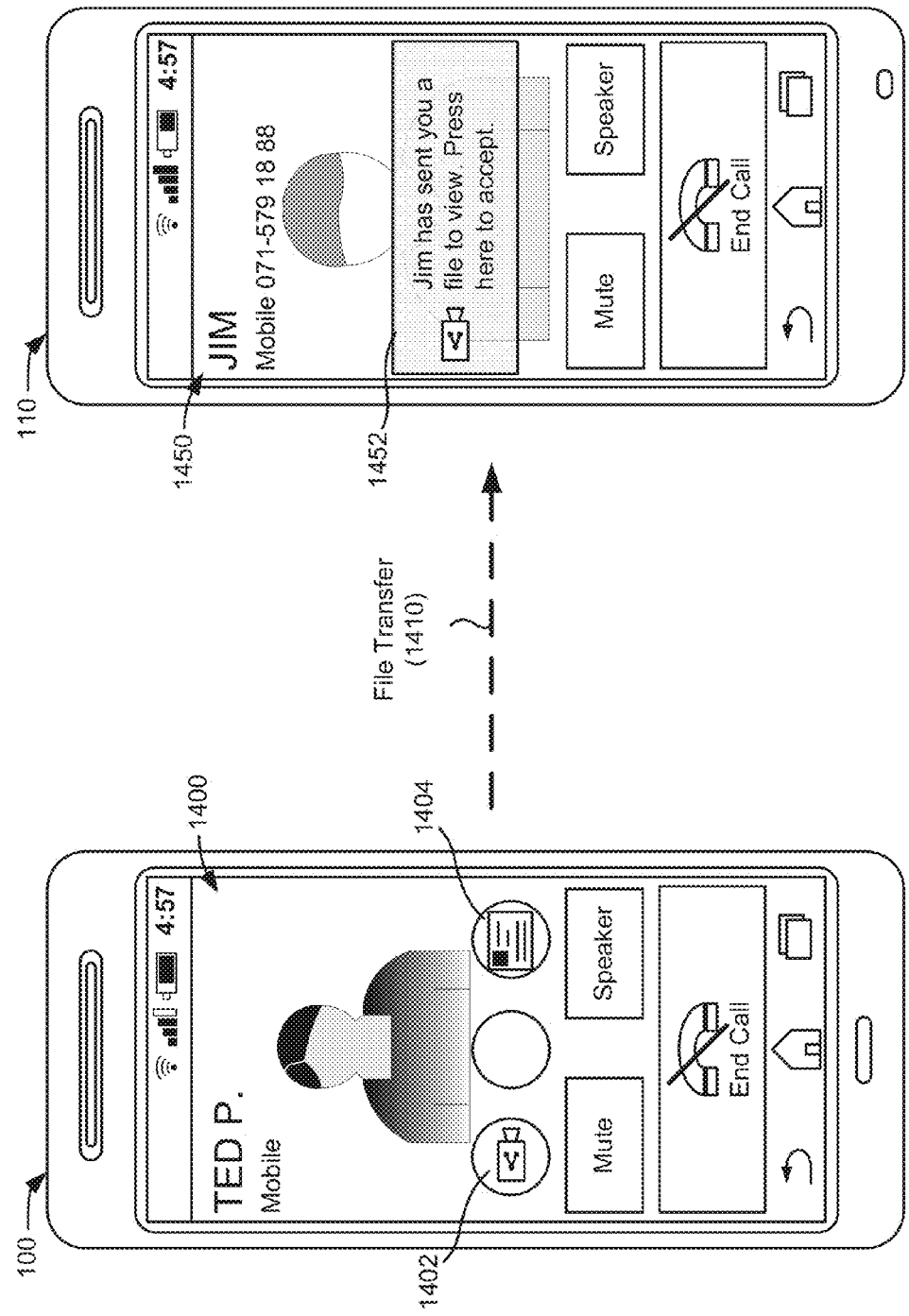

FIG. 14 is a schematic of user interfaces for an ongoing call between calling device 100 and receiving device 110, according to another implementation described herein. User interfaces 1400 (for calling device 100) and 1450 (for receiving device 110) may present steps to conduct a file transfer 1410 between devices during a call.

In one implementation, the file for file transfer 1410 may be a streaming video file. A user of calling device 100, for example, may quickly be able to share a video clip (e.g., a "magic moment" recorded on calling device 100) with the user of receiving device 110. During a phone call, the user of calling device 100 can press a virtual button 1402 to record/share video and then transfer the video to receiving device 110. Communications for file transfer 1410 may utilize RCS file transfer protocols when available.

In another implementation, the file for file transfer 1410 may be a vcard. For example, when calling another user, the calling user's vcard can be automatically synced to the other user. The idea is to give control of the contact information to the contact itself. Thus, if a user of calling device 100 updates a profile picture, the new profile picture can be seen when calling device 100 calls another user. Similarly, if a new phone number is added, the new phone number will automatically be synced to other users. In another implementation, the updated information may be automatically pushed it to all contacts to the phone book, without waiting for a call to actually take place before the vcard exchange and/or synchronization is done. In still another implementation, a user of a device (e.g., calling device 100) may press a virtual button 1404 to initiate a vcard transfer to another device (e.g., receiving device 110).

As shown in FIG. 14, receiving device 110 may begin to receive file(s) via file transfer 1410 and may notify the user of receiving device 110. For example, receiving device 110 may present notification 1452 on user interface 1450 to allow the user to accept the transferred file.

Systems and/or methods described herein may employ an extra set of applications, or plug-ins, built upon IMS and RCS to provide a richer feature set for pending and/or ongoing phone calls. Mobile devices may use capabilities identification protocols for IMS/RCS to determine available features of other mobile devices (e.g., devices in a contact list). If relevant features are available on both devices, SIP messages may be provided in parallel with a call between mobile devices to invoke features for call priority notification, preliminary location information, and/or detailed location information. Features may be indicated by feature tags for individual features (e.g., call priority, location, etc.).

The foregoing description of implementations provides illustration, but is not intended to be exhaustive or to limit the implementations to the precise form disclosed. Modifications and variations are possible in light of the above teachings or may be acquired from practice of the teachings.

In the above, while series of blocks have been described with regard to the exemplary processes, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "component" that performs one or more functions. This component may include hardware, such as a processor, a microprocessor, an application specific integrated circuit, or a field programmable gate array, software, or a combination of hardware and software.

The term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a mobile device, comprising:
receiving, via a user interface, a selection to call a contact's mobile device;
detecting a feature, on the contact's mobile device, that supports presenting a priority call notification;
initiating, via a first communication protocol, a pending call to the contact's mobile device;
presenting, after the initiating of the pending call and prior to the pending call being connected, and based on the detecting the feature, a user interface to select a priority indicator option;
receiving, via the user interface and after the initiating of the pending call, a selection of the priority indicator option; and
sending, via a second communication protocol, a priority indication flag for the pending call.

2. The method of claim 1, wherein the detecting the feature that supports presenting the priority call notification includes:
using Rich Communication Services (RCS) protocols to identify capabilities of the contact's mobile device.

3. The method of claim 2, wherein the detecting the feature that supports presenting the priority call notification includes providing a Session Initiation Protocol (SIP) OPTIONS signal to discover capabilities information of the contact's mobile device prior to receiving the selection of the contacts' mobile device to call.

4. The method of claim 1, wherein the first communication network includes:
a mobile voice network, and wherein the second communication network includes a mobile data network.

5. The method of claim 1, wherein presenting the user interface to selected the priority indicator option includes:
presenting an icon, on an outgoing call screen, that is selected to mark the priority of the pending call after the pending call is initiated.

6. The method of claim 1, wherein sending the priority indication flag for the pending call includes at least one of:
sending a Session Initiation Protocol (SIP) message that includes a tag to indicate the feature for presenting a priority call notification, or
sending a Message Session Relay Protocol (MSRP) message with data indicating the priority call notification.

7. The method of claim 6, wherein the SIP message includes data for the priority indication in one of JavaScript Object Notation (JSON) format or Extensible Markup Language (XML) format.

8. The method of claim 1, further comprising:
storing, in a memory of the mobile device, a plug-in application for a user interface to support the priority call notification.

9. The method of claim 1, wherein the priority indication flag is configured to cause the contact's mobile device to present a call priority indication on an incoming call screen, associated with the pending call, of the contact's mobile device.

10. A mobile device, comprising:
a memory to store a plurality of instructions and a plug-in application for a user interface to support priority call notification; and
a processor configured to execute the instructions in the memory to:
receive, via the user interface, a selection of a contact's mobile device to call;
detect a feature, on the contact's mobile device, that supports presenting a priority call notification;
initiate, via a first communication network, a pending call to the contact's mobile device;
present, after the initiation of the pending call and prior to the pending call being connected, and based on the detecting the feature, a user interface to select a priority indicator option;
receive, via the user interface and after the initiation of the pending call, a selection of the priority indicator option; and
send, via a second communication network, a priority indication flag for the pending call.

11. The mobile device of claim 10, wherein, when detecting the feature that supports presenting the priority call notification, the processor is further configured to:
detect the feature of the contact's mobile device prior to receiving the selection of the contacts' mobile device to call.

12. The mobile device of claim 11, wherein, when detecting the feature that supports presenting the priority call notification, the processor is further configured to:
use Rich Communication Services (RCS) protocols to identify capabilities of the contact's mobile device.

13. The mobile device of claim 10, wherein, when presenting the user interface to select the priority indicator option, the processor is further configured to:
present an icon, on an outgoing call screen, that is configured to be selected to mark the priority of the pending call after the pending call is initiated.

14. The mobile device of claim 13, wherein the priority indication flag is configured to cause the contact's mobile device to present a call priority indication on an incoming call screen, associated with the pending call, of the contact's mobile device, and
wherein the priority indication flag is included within a Session Initiation Protocol (SIP) message that includes a tag to indicate the feature for presenting a priority call notification.

15. A method performed by a mobile device, comprising:
storing, in a memory of the mobile device, a plug-in application for a user interface to support a priority call notification feature;
providing, to a calling mobile device, an indication of the priority call notification feature;
receiving, from the calling mobile device and via a first communication protocol, an indication of an incoming call;
receiving, from the calling mobile device and via a second communication protocol, a priority indication flag for the incoming call;
presenting a user interface screen for the incoming call, wherein the user interface screen includes a call notification of the incoming call, based on the received indication, and a priority notification for the incoming call, based on the received priority indication flag; and
outputting an audible ring tone for the incoming call while the mobile device is in a silent mode.

16. The method of claim 15, further comprising:
providing an audible version of the priority notification for the incoming call when the priority indication flag is received while another call is in progress on the mobile device.

17. The method of claim 15, wherein providing the indication of the priority call notification feature includes:
providing capabilities of the mobile device to the calling mobile device via Rich Communication Services (RCS) protocols.

18. The method of claim 15, further comprising:
detecting the received priority indication flag within a Session Initiation Protocol (SIP) message tag.

19. The method of claim 15, further comprising:
storing, in a call log for the mobile device, a record of the priority indication flag associated with the incoming call.

20. The method of claim 15, further comprising:
altering, based on the received priority indication flag, a ring tone type or ring tone volume for the incoming call.

* * * * *